(12) United States Patent
Knittle (10) Patent No.: US 11,478,865 B2
(45) Date of Patent: Oct. 25, 2022

(54) CUTTING DEVICE WITH INTEGRATED AND INTERRUPTIBLE AUXILIARY POWER SUPPLY

(71) Applicant: Larry Knittle, Canfield, OH (US)

(72) Inventor: Larry Knittle, Canfield, OH (US)

( * ) Notice: Subject to any disclaimer, the term of this patent is extended or adjusted under 35 U.S.C. 154(b) by 0 days.

(21) Appl. No.: 17/191,925

(22) Filed: Mar. 4, 2021

(65) Prior Publication Data

US 2021/0276110 A1    Sep. 9, 2021

Related U.S. Application Data

(60) Provisional application No. 62/985,987, filed on Mar. 6, 2020.

(51) Int. Cl.
| | |
|---|---|
| *B23D 47/02* | (2006.01) |
| *B23D 59/00* | (2006.01) |
| *B27B 27/06* | (2006.01) |
| *B27B 5/29* | (2006.01) |
| *B23D 45/04* | (2006.01) |
| *F21V 21/14* | (2006.01) |
| *B27B 27/08* | (2006.01) |

(52) U.S. Cl.
CPC ........... *B23D 47/02* (2013.01); *B23D 59/006* (2013.01); *B27B 5/29* (2013.01); *B27B 27/06* (2013.01); *F21V 21/14* (2013.01); *B23D 45/044* (2013.01); *B23D 45/048* (2013.01); *B27B 27/08* (2013.01); *Y10T 83/207* (2015.04); *Y10T 83/7693* (2015.04); *Y10T 83/7697* (2015.04)

(58) Field of Classification Search
CPC ..... F21V 21/14; B23D 45/048; B23D 59/006; Y10T 83/7697; Y10T 83/7693; Y10T 83/207; B25F 5/00; B26D 7/18; B26D 7/1863; B23Q 11/0046; B23Q 11/006
USPC ......... 83/520, 486.1, 490, 471.2, 471.3, 100
See application file for complete search history.

(56) References Cited

U.S. PATENT DOCUMENTS

| | | | | |
|---|---|---|---|---|
| 2,372,699 A | * | 4/1945 | Wiken | B23Q 11/10 83/100 |
| 2,604,126 A | * | 7/1952 | Wiken | B23D 55/023 83/810 |

(Continued)

FOREIGN PATENT DOCUMENTS

| | | | | |
|---|---|---|---|---|
| CN | 210616827 U | * | 5/2020 | ............... B27G 3/00 |
| NL | 9300837 A | * | 12/1994 | ........... B23D 59/006 |

OTHER PUBLICATIONS

CN-210616827-U English Translation; May 2020 CN; Mo Z.*

*Primary Examiner* — Laura M Lee
(74) *Attorney, Agent, or Firm* — Brennan, Manna & Diamond, LLC (57) ABSTRACT

An improved cutting device with an integrated and interruptible auxiliary power supply. In a preferred embodiment, the improved cutting device is a miter saw having a trigger mechanism for controlling a cutting implement, and at least one 120V or 240V auxiliary power outlet. Electrical power is only provided to the cutting implement and the auxiliary power outlet when the triggering or a similar mechanism is activated, and the release of the triggering mechanism by the user automatically shuts off electrical power to both the cutting implement and the at least one auxiliary power outlet. The auxiliary power outlet is useful for powering any number of different accessories including, without limitation, a light, vacuum source, etc., and is repositionable.

6 Claims, 6 Drawing Sheets

(56) References Cited

U.S. PATENT DOCUMENTS

| | | | | |
|---|---|---|---|---|
| 2,811,574 A * | 10/1957 | Guerrero | H02G 3/185 | 174/57 |
| 2,839,102 A * | 6/1958 | Kido | B23Q 11/0046 | 144/252.2 |
| 4,201,256 A * | 5/1980 | Truhan | B01D 45/12 | 144/252.2 |
| 4,300,426 A * | 11/1981 | Weaver | B23D 59/006 | 30/375 |
| 4,817,839 A * | 4/1989 | Weissman | B24B 27/0666 | 225/2 |
| 5,445,056 A * | 8/1995 | Folci | B23D 59/006 | 83/100 |
| 5,780,775 A * | 7/1998 | Yu | H01R 13/641 | 174/135 |
| 6,058,612 A * | 5/2000 | Leyva | B25F 5/00 | 30/388 |
| 6,470,778 B1 * | 10/2002 | Kaye, Jr. | B23D 59/006 | 144/252.1 |
| 6,702,608 B2 * | 3/2004 | Brennan, Jr. | B25H 3/00 | 280/47.19 |
| 6,960,124 B2 * | 11/2005 | Lee | B23Q 11/0046 | 83/100 |
| 6,988,435 B2 * | 1/2006 | Kao | B23Q 11/0046 | 83/486.1 |
| 7,044,039 B2 * | 5/2006 | Powell | B23D 59/006 | 83/100 |
| 7,214,102 B2 * | 5/2007 | Chong | H01R 35/04 | 439/640 |
| 7,341,481 B2 * | 3/2008 | Spiri | H02H 9/001 | 439/535 |
| 7,605,330 B1 * | 10/2009 | Black | H02G 3/185 | 174/53 |
| 7,989,718 B1 * | 8/2011 | Weber | B23B 39/10 | 200/51 R |
| 8,561,512 B2 * | 10/2013 | Loveless | B23D 59/006 | 83/168 |
| 8,869,786 B2 * | 10/2014 | Faiweather | B28D 7/046 | 125/13.01 |
| 9,463,564 B2 * | 10/2016 | Macauda | B25F 5/00 | |
| 9,827,625 B2 * | 11/2017 | Koegel | F16L 27/111 | |
| 9,882,382 B2 * | 1/2018 | Balthazar | H02J 3/14 | |
| 10,543,622 B2 * | 1/2020 | Fairweather | B01D 46/0075 | |
| 2005/0092155 A1 * | 5/2005 | Phillips | B27B 27/10 | 83/581 |
| 2007/0205665 A1 * | 9/2007 | Kawano | B23D 59/002 | 307/31 |
| 2008/0035507 A1 * | 2/2008 | Collister | B25H 3/006 | 206/349 |
| 2009/0139048 A1 * | 6/2009 | Williams | B23D 59/006 | 15/347 |
| 2011/0192262 A1 * | 8/2011 | Loveless | B23D 59/006 | 83/168 |
| 2021/0229196 A1 * | 7/2021 | Guth | B28D 1/047 | |
| 2021/0276110 A1 * | 9/2021 | Knittle | F21V 21/14 | |

* cited by examiner

CUTTING DEVICE WITH INTEGRATED AND INTERRUPTIBLE AUXILIARY POWER SUPPLY

CROSS-REFERENCE TO RELATED APPLICATION

The present application claims priority to, and the benefit of, U.S. Provisional Application No. 62/985,987, which was filed on Mar. 6, 2020, and is incorporated herein by reference in its entirety.

FIELD OF THE INVENTION

The present invention relates generally to a new and improved cutting device having an integrated and interruptible auxiliary power supply for, by way of example, powering a vacuum source, light, or other accessory. More specifically, in one embodiment, the invention relates to a compound miter saw with integrated power outlets, wherein the power outlets only provide electrical power when the miter saw trigger is engaged. Accordingly, the present specification makes specific reference thereto. However, it is to be appreciated that aspects of the present invention are also equally amenable to other like applications, devices and methods of manufacture.

BACKGROUND OF THE INVENTION

Electrically powered cutting devices, such as compound miter saws, are traditionally used by professionals on construction jobsites, and by homeowners and hobbyists for various home improvement projects and other tasks. When cutting wood or other materials using a miter saw, creating particulate residue in the form of sawdust or other material is inevitable due to the nature of the cutting process. Furthermore, over time, said sawdust and residue can build up on the cutting surface of the saw or the saw itself and can impact the operation of the saw and the cleanliness of the surrounding area. Therefore, it is advisable for a user to routinely clean the sawdust from the saw and the surrounding area.

Typically, a vacuum device, such as a Shop-Vac, is used to vacuum or clean sawdust created by a cutting device. This process can be both time-consuming and inconvenient, and tends to interrupt the timeline of the underlying project that the user is working on by causing delays. For example, most users will continue to operate the cutting device until the project is complete, or until the sawdust interferes with the operation of the cutting device in an effort to avoid having to repeatedly stop the project to vacuum up the sawdust or other debris. Accordingly, many existing cutting devices, and miter saws in particular, have a designated fitting near the cutting surface to attach a vacuum hose or other vacuum source to collect sawdust as it is created by the cutting of material to mitigate this issue. However, with these types of cutting devices, the user must take an additional step of powering on the vacuum supply, which requires the user to either stop the operation of the cutting device to do so, or to take his or her focus off of the cutting device while it is still operational, which can be both inefficient and dangerous.

Additionally, these types of arrangements are also inefficient from a power consumption standpoint, as a user may elect to simply leave the vacuum on throughout the entire cutting process to circumvent the need to power down the cutting device or attempt to turn on the vacuum source while also operating the cutting device, which as stated above may be dangerous. Furthermore, most vacuum devices are loud, averaging a decibel level of between 75 and 85 db, and studies have shown that prolonged exposure to decibel levels over 80 db can be detrimental to an individual's hearing. Therefore it is undesirable for a user to permit the vacuum to run continuously for the entire cutting process, particularly in an enclosed space where the noise may be further amplified.

Some cutting devices may allow a user to control a vacuum or other electrical apparatus from a switch on the cutting device itself. However, these types of cutting devices do not resolve the inefficiencies that are apparent in the traditional practice of utilizing a cutting device and a separate vacuum apparatus in conjunction with one another; as a user must still manually flip an additional switch to the "on" position to supply power to the vacuum source.

Therefore, there exists a long felt need in the art for an improved cutting device, such as a miter saw, with one or more integrated and interruptible power outlets that conserves electrical power and that does not cause undue distraction of the user which could result in injury. More specifically, there is a long felt need in the art for an improved cutting device, wherein the auxiliary power outlets only provide electrical power when the trigger of the cutting device is engaged. Finally, there is a long felt need in the art for an improved cutting device that is relatively inexpensive to manufacture and relatively safe and easy to use.

The present invention, in one exemplary embodiment, discloses an improved cutting device, such as a miter saw, with a plurality of integrated and interruptible auxiliary power outlets. The plurality of auxiliary power outlets are preferably integrated into the housing of the cutting device, and electric power to said outlets is controlled by the actuation of the trigger of the cutting device, which also engages the cutting implement, such as a saw blade.

In this manner, the improved cutting device with integrated and interruptible auxiliary power supply of the present invention accomplishes all of the forgoing objectives, thereby allowing a user to use a vacuum or other accessory device in conjunction with a cutting device without requiring any additional steps to power on the vacuum or accessory and without causing undue distraction to the user, which could result in injury.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one embodiment thereof, comprises an improved cutting device, such as a miter saw. The cutting device is preferably comprised of a base, a cutting surface on the top surface of the base, a cutting implement also attached to said base and that is repositionable in relation to the cutting surface, a motor for powering the cutting implement, at least one auxiliary power outlet, a trigger mechanism for activating the motor and a vacuum hose receptacle.

More specifically, the at least one auxiliary power outlet may be integrated into or attached to the base of the cutting device. In differing embodiments of the cutting device, at least one outlet may be located on one or more of the sides, front and rear surfaces of the base, as well as the side surfaces of the frame column. Each outlet is further in electrical communication with the trigger mechanism such that electrical power is only provided to the auxiliary outlet(s) when the trigger mechanism is engaged and the cutting implement is operational. The outlet(s), in turn, can be used to power, for example, a vacuum source in fluid communication with the vacuum hose receptacle and/or any other accessory, such as a light, whenever the cutting implement is operational.

In differing embodiments of the cutting device, the outlets may further swivel and/or rotate relative within the base. Additionally, the outlets may be able to be extended outwards from the base via an extension cord to allow a user to position the outlet in an appropriate position to facilitate the use of secondary items, such as a vacuum source. Further, a number of outlets may be combined together to form a power strip in one location of the base.

Further, the cutting surface may be comprised of a plurality of continuous openings, wherein the openings are connected to a tubing within the base. Once a vacuum source is activated, the openings may be used to collect sawdust/debris that is produced during a cutting operation such that the dust/debris is vacuumed into the base through the tubing via the vacuum source. In addition, the cutting surface may also be comprised of a repositionable fence that is also comprised of a plurality of continuous openings that are further connected to the internal tubing and in communication with the vacuum source.

As such, the improved cutting device with integrated and interruptible auxiliary power supply allows a user to limit the amount of excess saw dust/debris produced while cutting. Further, the manner in which the cutting device allows a user to limit the amount of saw dust/debris produced requires minimal effort. In addition, the cutting device conserves power, and reduces the amount of time a vacuum source produces sound to mitigate the risk of hearing loss to the user due to prolonged exposure to excessive noise within an enclosed space.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTON

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As noted above, there exists in the art a long felt need for an improved cutting device, such as a miter saw, with a vacuum hose receptacle and a plurality of integrated and interruptible auxiliary power outlets that allow a user to control the flow of electrical power to said auxiliary power outlets via the trigger mechanism that is used to otherwise operate the cutting device, and without the need to take additional action or divert the user's attention away from the cutting operation at hand. More specifically, there is a long felt need in the art for an improved cutting device, wherein the auxiliary power outlets only provide electrical power when the trigger of the cutting device is engaged. In turn, the integrated and interruptible auxiliary power outlets may be used to power a vacuum source that is in electrical communication with the vacuum hose receptacle, and/or any other accessory requiring electrical power, such as a light, whenever the cutting implement is operational. Further, one or more of the integrated and interruptible auxiliary power outlets may be repositionable in relation to the cutting device. Finally, there is a long felt need in the art for an improved cutting device that is relatively inexpensive to manufacture and relatively safe and easy to use.

Figure 1:
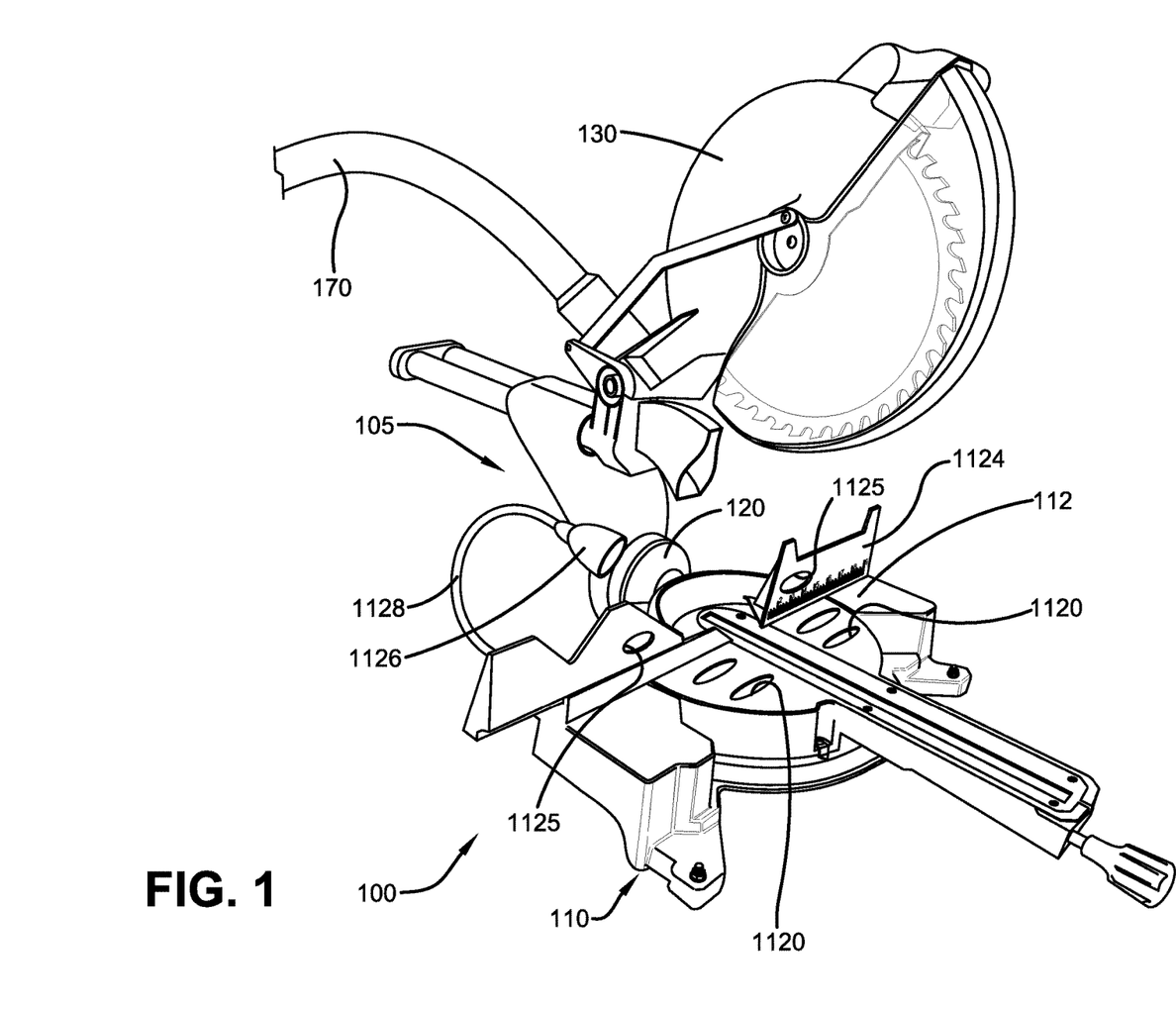
FIG. 1 illustrates a perspective view of one potential embodiment of the improved cutting device with an integrated and interruptible power outlet of the present invention in accordance with the disclosed architecture, wherein the device is further comprised of a light and a plurality of continuous vacuuming holes.

Referring initially to the drawings, FIG. 1 illustrates a perspective view of one potential embodiment of the improved cutting device 100 with an integrated and interruptible power outlet of the present invention in the form of a miter saw, and that is further comprised of a light 1126 and a plurality of continuous vacuuming holes 1120 in accordance with the disclosed architecture. Nonetheless, the applicability of the concepts of the present invention are not limited to miter saws, and the same may be used with a wide variety of other cutting devices including, without limitation, table saws, radial arm saws, jig saws, band saws, chop saws, scroll saws, planers, joiners, and other electrically powered tools.

The cutting device 100 is preferably comprised of a frame 105, a base 110, a cutting surface 112 on the top surface of the base 110, a cutting implement 140 attached to said base 110 via a frame arm 120 and that is repositionable in relation to the cutting surface 112, an electrical motor 150 for powering the cutting implement 140, a trigger mechanism 160 for activating the motor 150, at least one, and preferably multiple, power outlet 180, and a vacuum hose 170. Unless otherwise stated herein, each of the base 110, cutting surface 112, cutting implement 140, motor 150, trigger mechanism 160 and vacuum hose 170 are of a type currently known in the art and commercially available at most hardware stores.

The base 110 is preferably comprised of a relatively flat top-surface in the form of a cutting surface 112. In differing embodiments of the cutting device 100, the base 110 may be round, square, rectangular, octagonal, etc. Further, the cutting surface 112 may be further comprised of a repositionable fence 1124 that allows a user to make square and relatively even cuts of wood or other materials by placing the wood/materials against the fence 1124, as is known in the art of woodworking.

Figure 5:
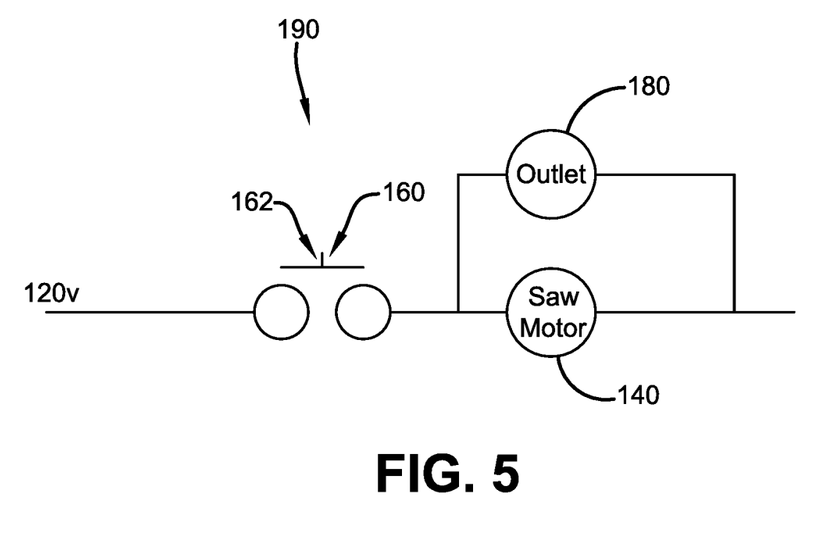
FIG. 5 illustrates a schematic circuit diagram of one potential embodiment of the improved cutting device with an integrated and interruptible power outlet of the present invention and in accordance with the disclosed architecture.

The trigger mechanism 160 is further comprised of a trigger 162 that, when engaged by a user (not shown), is capable of completing an electric circuit 190, such as the one depicted in FIG. 5, and providing electrical power to both the motor 150 and the at least one auxiliary power outlet 180. More specifically, the electric power provided to the motor 150 will cause the cutting implement 140 to function as intended (i.e., to cut a piece of wood or other material placed on the cutting surface 112 in the path of the cutting implement 140), and the electric power provided to the auxiliary power outlets 180 will automatically power any accessories or other electrically powered devices that are plugged into the auxiliary power outlets 180 of the cutting device 100. Such electrically powered devices may include, without limitation, a repositionable light 1126, wherein, in one embodiment, the repositionable light 1126 may be comprised of a flexible, repositionable neck 1128 that may be removably or fixedly attached to any portion of the base 110, frame arm or column 120, or blade cover 130 to illuminate the cutting surface 112 as needed and as best shown in FIG. 1.

Figure 4:
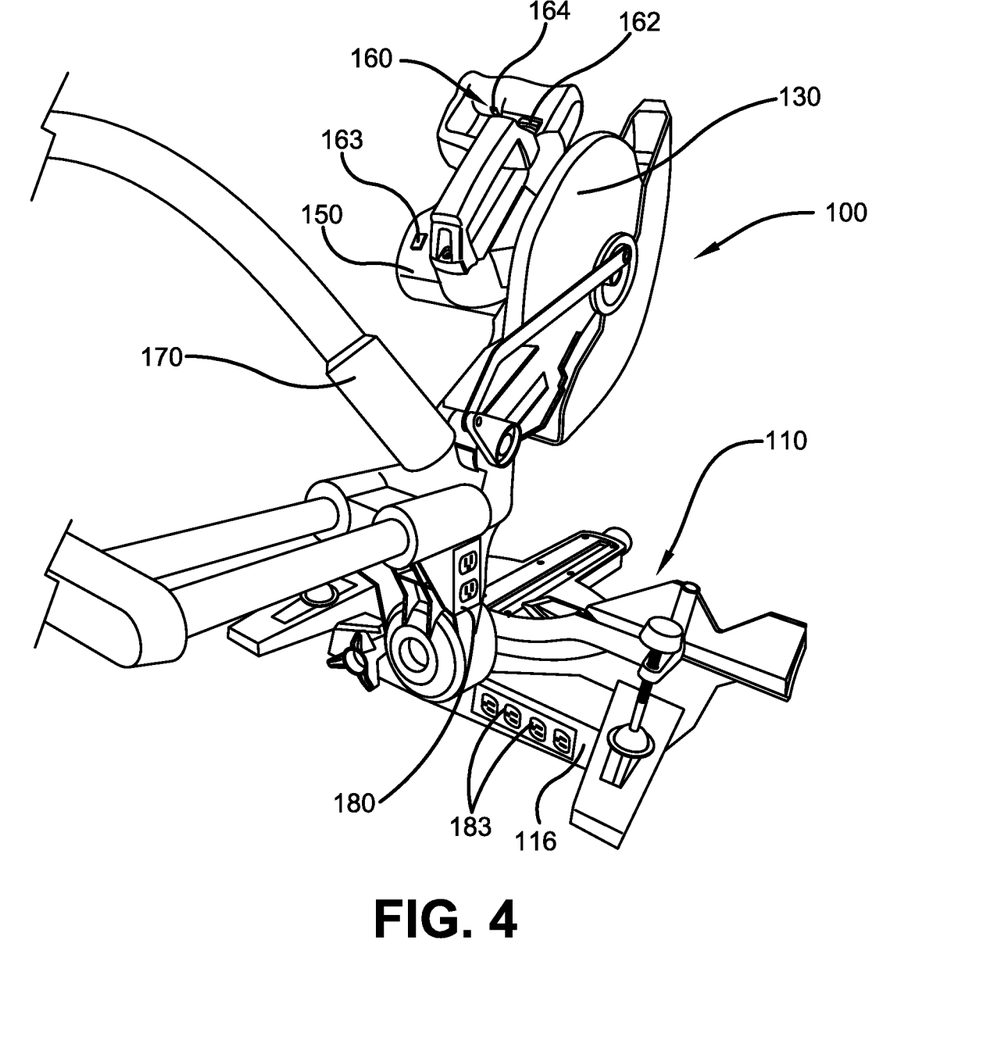
FIG. 4 illustrates a rear perspective view of one potential embodiment of the improved cutting device with an integrated and interruptible power outlet of the present invention in accordance with the disclosed architecture.

In an alternate embodiment of the cutting device 100, a portion of the trigger 162 or trigger mechanism 160 may be comprised of a sensor 164, as seen in FIG. 4. The sensor 164 is preferably placed on an area of the trigger 162 or trigger mechanism 160 that is covered by a user's hand when using the mechanism 160 (e.g. when depressing the trigger 162 to make a cut). Accordingly, when a user places their hand over the sensor 164 or covers the sensor 164 in the process of actuating the trigger 162, the electric circuit 190 is completed which provides electrical power to both the motor 150 and the at least one auxiliary power outlet 180. As such, the electric power provided to the motor 150 will cause the cutting implement 140 to function as intended (i.e., to cut a material placed on the cutting surface 112), and the electric power provided to the auxiliary power outlets 180 will automatically power any accessories or devices plugged into the device 100 therein such as, without limitation, a repositionable light 1126, wherein the light 1126 is comprised of a flexible, repositionable neck 1128 that may be removably or fixedly connected to any portion of the base 110, frame column 120, or blade cover 130 to illuminate the cutting surface 112 as needed, as seen in FIG. 1.

Figure 3A:
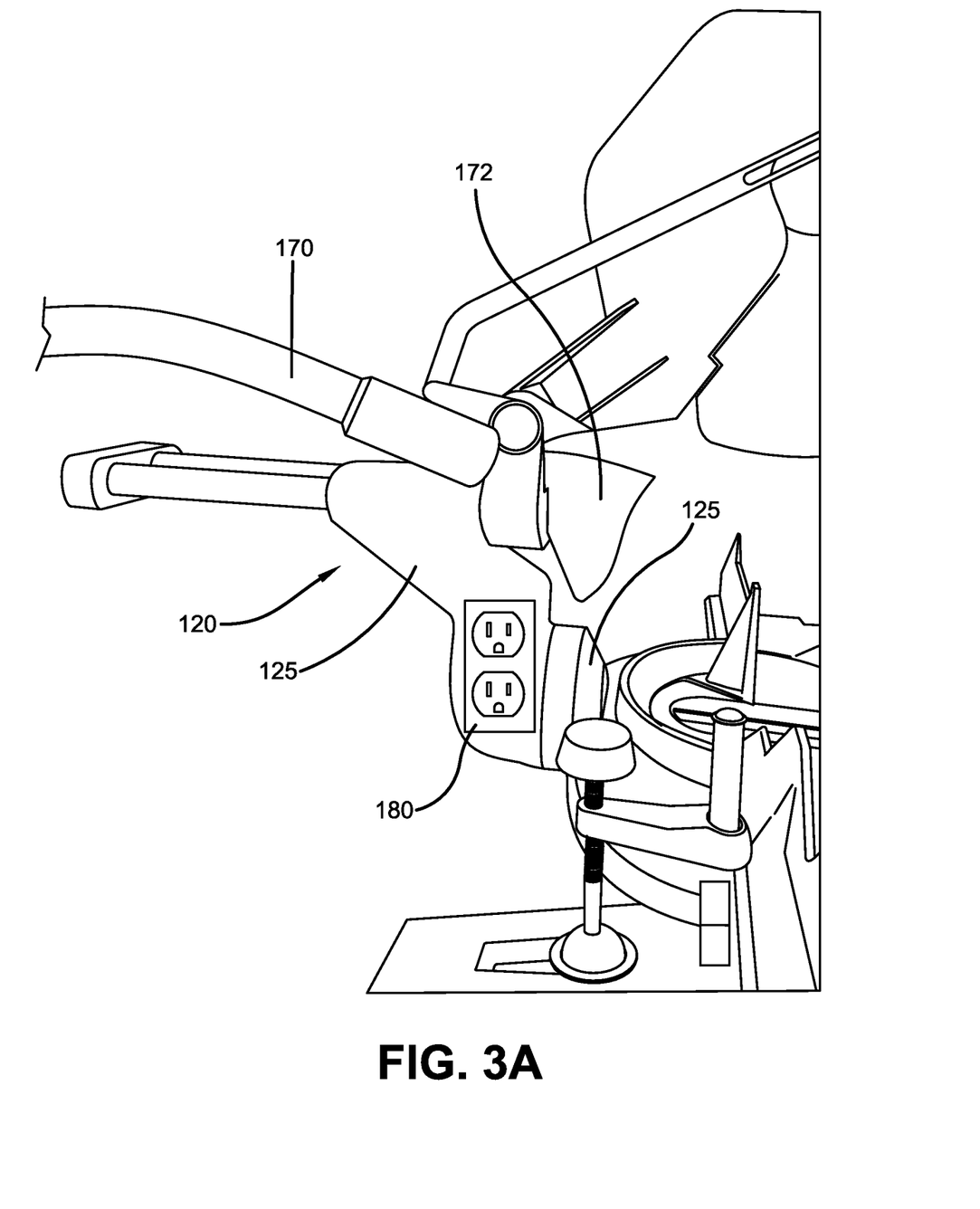
FIG. 3A illustrates a side perspective view of one potential embodiment of the improved cutting device with an integrated and interruptible power outlet of the present invention and in accordance with the disclosed architecture.
Figure 3B:
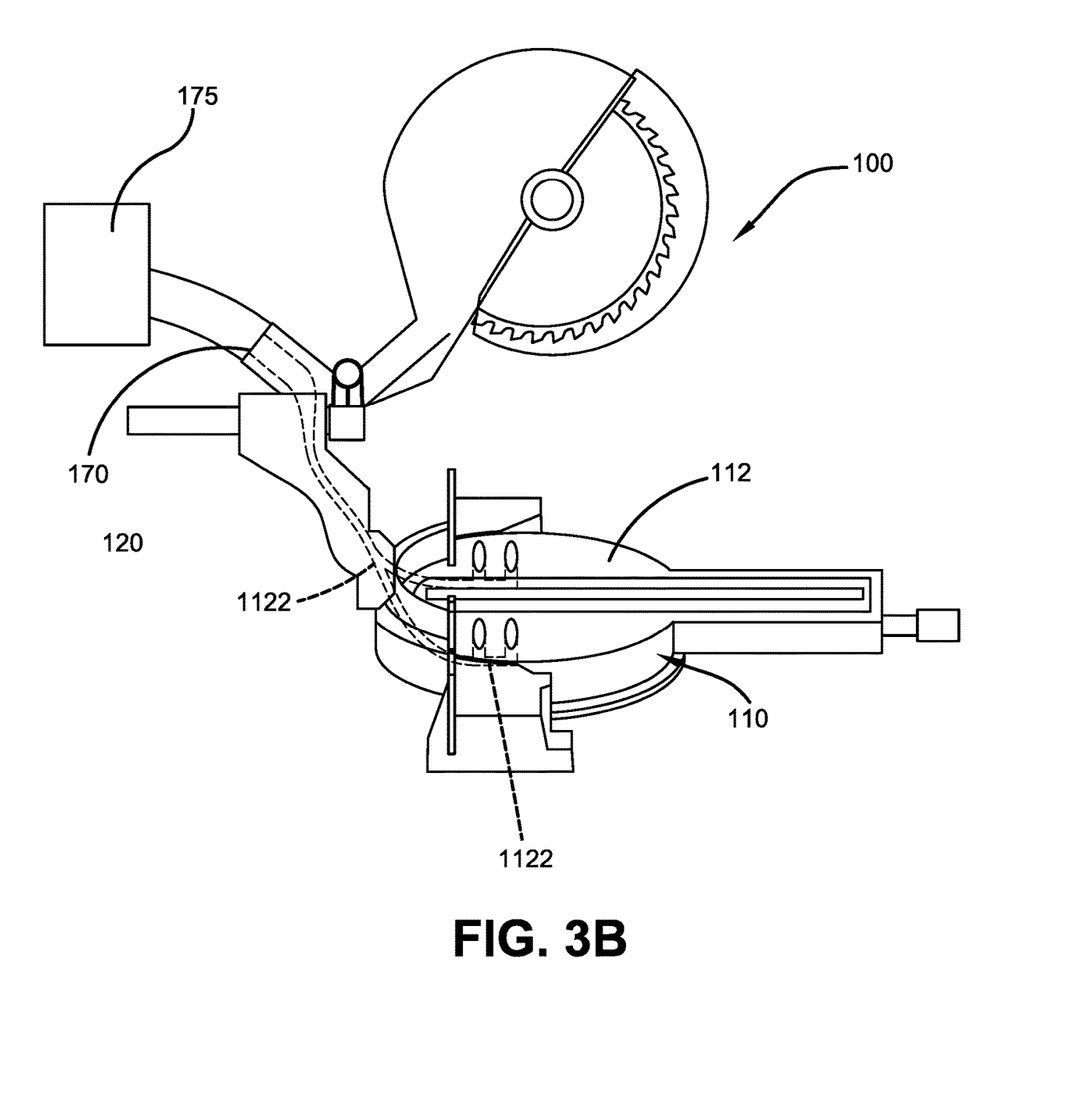
FIG. 3B illustrates a side perspective view of one potential embodiment of the improved cutting device with an integrated and interruptible power outlet of the present invention in accordance with the disclosed architecture, wherein the device further comprises a plurality of interior vacuum channels.

The auxiliary power outlet(s) 180 may also be used to power a vacuum source 175 that is in fluid communication with the vacuum hose 170. More specifically, a vacuum collection head 172 is connected to, and in fluid communication with, the vacuum hose 170, wherein the vacuum collection head 172 collects sawdust and other debris that is created by a cutting operation via one or more continuous openings 1120 in, or positioned adjacent to, the cutting surface 112, as best illustrated in FIG. 1. More specifically, each of the one or more continuous openings 1120 is preferably in fluid communication with internal tubing 1122 positioned within the base 110 that is further in fluid communication with the vacuum source 175. Accordingly, when the vacuum source 175 is connected to the improved cutting device 100 and electrically powered, any saw dust/debris that falls or is sucked via the vacuum force into the openings 1120 will travel through the internal tubing 1122 positioned within the base 110, through the central frame column 120, and out through the vacuum hose 170 into a vacuum source 175 as best illustrated in FIG. 3B. Further, in differing embodiments of the improved cutting device 100, the repositionable fence 1124 may be comprised of a plurality of similar openings 1125 that are also in fluid communication with the internal tubing 1122 and the vacuum source 175, and that act in a similar manner to the openings 1120 in the cutting surface 112, as best illustrated in FIG. 1.

Importantly, the various accessories or devices that receive power from the one or more auxiliary power outlets 180, such as repositionable light 1126, vacuum source 175, etc., are only operational while the trigger 162 of trigger mechanism 160 is engaged. Once the trigger 162 is released by the user, the electrical power provided from a traditional wall outlet (not shown) or other source such as generator, battery, etc., to both the motor 150 and the auxiliary power outlets 180 of the improved cutting device 100 will immediately cease, as the circuit 190 will be interrupted, as best illustrated in FIG. 5. In this manner, the novel and improved cutting device with an integrated and interruptible power outlet 100 enables a user to use a vacuum or other accessory device in conjunction with a cutting device 100 without requiring any additional steps to power on the vacuum or the accessory, and without causing undue distraction to the user, which could result in injury.

In differing embodiments of the improved cutting device 100, the auxiliary and interruptible power outlets 180 may be comprised of a plurality of female or male 120V/240V outlets to suit user need and/or preference. Nonetheless, in yet other embodiments of the cutting device 100, at least one of the outlets 180 may also be comprised of a USB outlet such as, but not limited to, a USB-A, USB-B, Micro-B, Micro-USB, Mini-USB, USB-C outlet, etc. Further, and as best illustrated in FIGS. 2, 3A and 4, the auxiliary and interruptible power outlets 180 may be located on any portion of the base 110 including, without limitation, the side surfaces 114 and/or the rear surface 116, as well as the side surfaces 125 of the central frame 120.

Figure 2:
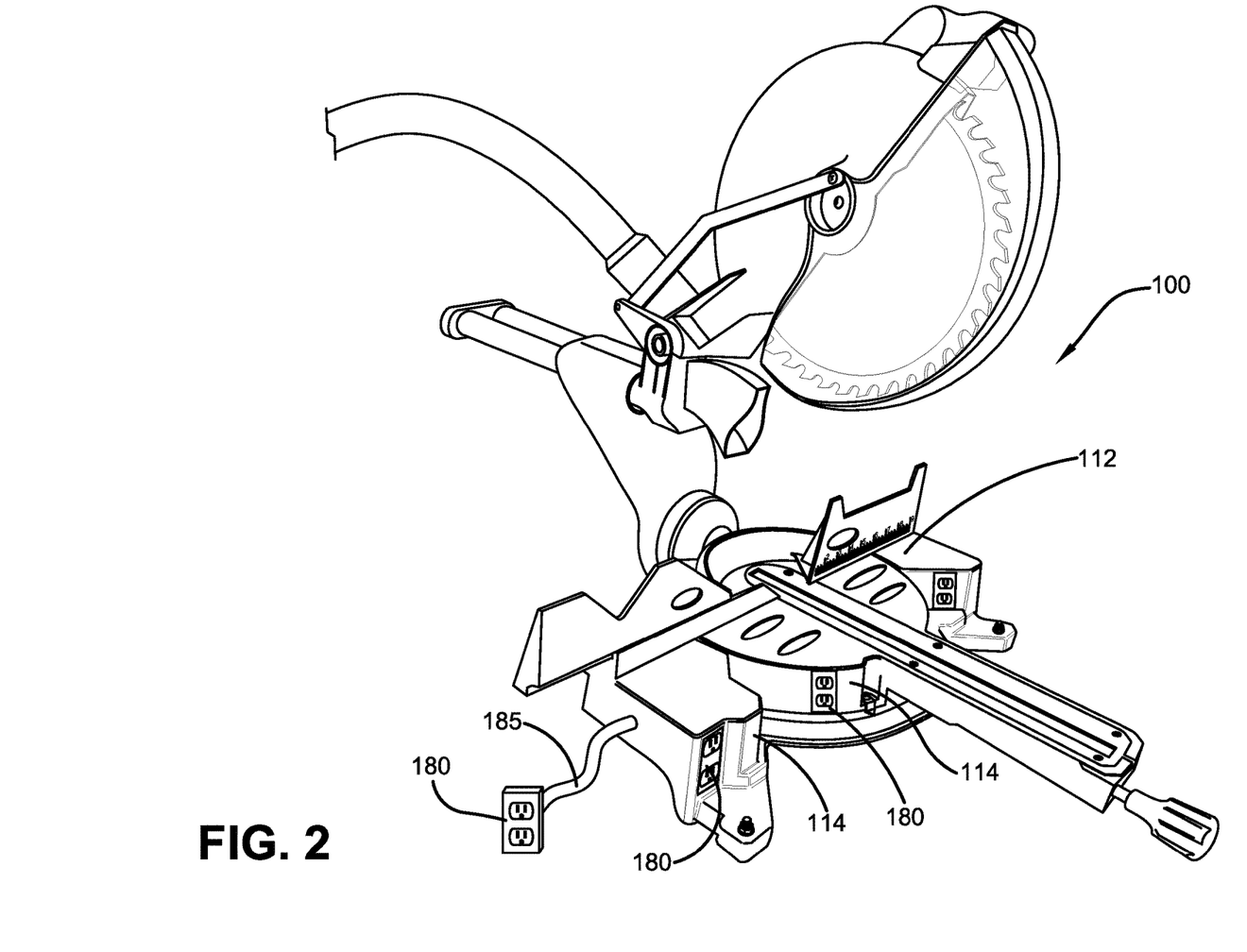
FIG. 2 illustrates a perspective view of one potential embodiment of the improved cutting device with an integrated and interruptible power outlet of the present invention in accordance with the disclosed architecture, wherein the device is further comprised of a repositionable outlet.

Further, any one or more of the auxiliary and interruptible power outlets 180 may swivel/rotate within the base 110, or may be extended/pulled outwards from the base 110 via an integral extension cord 185 attached to the outlet 180 to more easily allow a user to plug a secondary device, such as a vacuum 175 into the outlet 180, as best illustrated in FIG. 2. Further, in one potential embodiment of the improved cutting device 100, the auxiliary and interruptible power outlets 180 may be combined into a power strip 183, as best illustrated in FIG. 4.

As stated above, FIG. 5 illustrates a schematic circuit diagram of one potential embodiment of the improved cutting device 100 of the present invention in accordance with the disclosed architecture. The circuit 190 is comprised of a trigger mechanism 160 having a trigger 162 that is repositionable by a user (not shown), and that is capable of completing or interrupting the electrical circuit 190. For example, when the trigger 162 is depressed by a user (not shown) or the sensor 164 is covered, the electrical circuit 190 is complete and electrical current or power is permitted to flow to both the motor 150 and each of the auxiliary power outlets 180, thereby powering the same and any accessory in electrical communication therewith, such as vacuum source 175, light 1126, etc.

Conversely, when the trigger 162 is not depressed by a user (not shown) or the sensor 164 is not covered, the circuit 190 is interrupted and electrical current or power is no longer permitted to flow to the motor 140 and/or auxiliary power outlets 180 of the improved cutting device 100, thereby cutting the power to the same and any accessory in electrical communication therewith, such as a vacuum source 175, light 162, etc. In a further embodiment of the present invention, it is also contemplated that the circuit 190 may further comprise a mechanism, such as manual override switch 163, for enabling a user to permit electrical current to flow to a select one of the motor 140 or one or more of the auxiliary power outlets 180, but not to both.

As such, the operation of automatically permitting the flow of electrical power to the auxiliary power outlets 180 only when the trigger 162 is depressed, or alternatively when the sensor 164 is covered, eliminates the need for the user to take the additional step of flipping a secondary switch, as any secondary switch can simply be left in the "on" position at all times. Additionally, the automatic activation of a vacuum source 175 in electrical communication with a select one of the plurality of auxiliary power outlets 180 and in fluid communication with vacuum hose receptacle 170, enables a user to keep both the improved cutting device 100 and its surrounding area relatively clean and free of sawdust throughout a project and despite the completion of numerous cuts of wood or other materials. Similarly, the automatic activation of a light source 1126 in electrical communication with a select one of the auxiliary power outlets 180 enables a user to more clearly view the work space in which he or she is operating, thereby improving efficiency and reducing the overall risk of injury.

Notwithstanding the forgoing, the improved cutting device with integrated and interruptible auxiliary power supply 100 and its various components can by any suitable size, shape, and configuration as is known in the art without affecting the overall concept of the invention, provided that it accomplishes the above stated objectives. One of ordinary skill in the art will appreciate that the shape, size and configuration of the improved cutting device with integrated and interruptible auxiliary power supply 100 and its various components, as shown in the FIGS. are for illustrative purposes only, and that many other shapes, sizes and configurations of the improved cutting device with integrated and interruptible auxiliary power supply 100 are well within the scope of the present disclosure. Although dimensions of the improved cutting device with integrated and interruptible auxiliary power supply 100 and its various components (i.e., length, width, and height) are important design parameters for good performance, the improved cutting device with integrated and interruptible auxiliary power supply 100 and its various components may be any shape or size that ensures optimal performance during use and/or that suits user need and/or preference.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An electrically powered cutting device comprising:
   a frame housing an internal tubing within the frame;
   a cutting surface having a plurality of vacuum openings therein;
   a repositionable fence comprising a plurality of openings therein;
   a cutting implement;
   a motor attached to the frame;
   a trigger repositionable between a first position and a second position and in electrical communication with the motor;
   a vacuum head attached to the frame above the cutting surface;
   a vacuum source in fluid communication with each of the plurality of vacuum openings via the internal tubing and the vacuum head;
   a first auxiliary power outlet in electrical communication with the trigger integrated and rotatable within a base of the frame; and
   a second auxiliary power outlet in electrical communication with the trigger integrated and stationarily fixed within the base of the frame.

2. The electrically powered cutting device of claim 1, wherein the at least one auxiliary power outlet comprises a USB port.

3. The electrically powered cutting device of claim 1 further comprising a sensor.

4. The electrically powered cutting device of claim 1, wherein electrical power is only provided to the motor and the at least one auxiliary power outlet when the trigger is in the second position.

5. The electrically powered cutting device of claim 1 further comprising a repositionable light and a second auxiliary power outlet is attached to a power cord.

6. The electrically powered cutting device of claim 1 further comprising a manual override switch that permits electrical power to be provided to a select one of the motor or the at least one auxiliary power outlet, but not to both.

* * * * *